United States Patent [19]

Bryson et al.

[11] Patent Number: 5,333,517
[45] Date of Patent: Aug. 2, 1994

[54] DRIVE SYSTEM FOR PROVIDING A MULTIPLE SPEED OUTLET IN A SINGLE ROTATIONAL DIRECTION FROM A REVERSIBLE INPUT

[75] Inventors: Rodney Bryson, Murfreesboro; Milton H. Borgman, Spring Hill, both of Tenn.

[73] Assignee: Standex International Corporation, Salem, N.H.

[21] Appl. No.: 63,162

[22] Filed: May 11, 1993

Related U.S. Application Data

[63] Continuation of Ser. No. 939,118, Sep. 2, 1992, abandoned.

[51] Int. Cl.$^5$ .................................................. F16H 5/52
[52] U.S. Cl. ................................................ 74/810.1
[58] Field of Search .......................... 74/664, 810.1

[56] References Cited

U.S. PATENT DOCUMENTS

| | | | |
|---|---|---|---|
| 599,508 | 2/1898 | Le Fevre | 74/810.1 X |
| 1,327,832 | 1/1920 | La Bar | 74/810.1 |
| 1,466,979 | 9/1923 | Whittington | 74/810.1 |
| 1,710,631 | 7/1927 | Loram | 74/810.1 |
| 1,905,114 | 4/1931 | Lauterber et al. | 475/11 |
| 2,494,436 | 1/1950 | Gerhardt | 74/810.1 X |
| 2,687,658 | 8/1954 | Nelson et al. | 74/810.1 |
| 2,810,305 | 4/1956 | Brinze et al. | 74/810.1 |
| 2,836,085 | 6/1955 | Snyder | 74/810.1 |
| 3,666,063 | 5/1972 | Shoeman et al. | 192/21 |
| 3,832,914 | 9/1974 | Pinfield | 74/810.1 |
| 4,501,169 | 2/1985 | Stilin | 74/810.1 |

FOREIGN PATENT DOCUMENTS 270838 8/1970 U.S.S.R. .

OTHER PUBLICATIONS

Hobart, Mar. 1991.
Hobart, Oct. 1986.
Model A-20 Brochure, PowerMaster, no date on brochure, received by Applicant in 1985.
Berkel Variatronic Mixers, Sep. 1991.
Crypto Peerless, Model ED121EF20, Apr. 1984.
Univex Mixer Instruction Manual, no publication date, received by Applicant in 1985, Sep. 1991.
Univex M12 Mixer, Nov. 1990.
Middleby Marshall Model GP620B (Bench) & Model GP620F (Floor) mixers, no publication date.
Reynolds Electric Operating Instructions and Service Manual, Mar. 11, 1993.
Varimixer Brochure, May 1990.
Operating Instructions Bear Varimixers, Oct. 1, 1981.
Operating and Spare Parts Manual For Rondo Bear Mixers, no publication date.
Blakeslee Mixer Models B20T & B20DT, Mar. 1987.

*Primary Examiner*—Dirk Wright
*Attorney, Agent, or Firm*—Luedeka, Neely & Graham

[57] ABSTRACT

A drive system for providing multiple output speeds in a single direction based upon a reversible input is disclosed. The drive system provides a dual drive path from an input to an output such that each separate drive path is capable of an overall gear ratio different from that of the other drive path. The drive path is selected by the direction of rotation of the input and is configured such that regardless of the drive path selected, the rotation of the output of the drive system will be in a single direction. The drive system utilizes two parallel auxiliary shafts disposed perpendicularly to a single drive shaft and an output shaft disposed parallel to the two auxiliary shafts. Both auxiliary shafts engage the drive shaft such that they are driven by the rotation of the drive shaft in directions opposite each other. Both auxiliary shafts have one way roller clutches disposed thereon so that the output will only be driven by one or the other of the auxiliary shafts depending on the direction of rotation of the drive shaft. The drive system of the present invention may be used in items such as commercial appliances to provide flexibility in selection of output speeds while maintaining a compact and easily serviced drive system.

12 Claims, 4 Drawing Sheets

5,333,517

DRIVE SYSTEM FOR PROVIDING A MULTIPLE SPEED OUTLET IN A SINGLE ROTATIONAL DIRECTION FROM A REVERSIBLE INPUT

This is a continuation of application Ser. No. 07/939,188, filed Sep. 2, 1992, now abandoned.

FIELD OF THE INVENTION

This invention relates generally to the field of drive systems and, particularly, to a multi-speed gear box capable of providing multiple unidirectional output speeds based upon a reversible input.

BACKGROUND OF THE INVENTION

The use of gear boxes to provide four output speeds in a single direction of rotation from a two-speed reversible drive input has been known in the commercial appliance art. Generally, most prior art gear boxes provide for one direct drive path from a drive shaft to an output shaft and one alternate drive path from a drive shaft to an auxiliary shaft to an output shaft. Generally, two rotational speeds are provided by the two forward speeds of the motor driving through the drive shaft to the output shaft and two additional speeds are provided by the two reverse speeds of the motor driving through the drive shaft and auxiliary shaft to the output shaft. This system provides for the desired four output speeds. However, such a system has drawbacks.

First, since the drive shaft directly drives the output shaft in one motor direction, any desired speed reduction or increase between the drive shaft and output shaft must be accomplished by a single gear pair. Thus, if a substantial reduction or increase is desired, a very large gear must be present on one of the two shafts, a design element which may be limited by the physical dimensions of the gear box. Additionally, since there is typically only a single gear pair in one drive path the flexibility to design various overall gear ratios through that drive path is extremely limited.

A second major drawback to such prior art drive systems is that the prior art design necessitates that all three shafts be parallel and thus, in a typical arrangement these shafts and the motor are provided in a vertical position. This vertical positioning results in a tall arrangement which requires considerable head room, a limiting factor when the placement of a commercial appliance in a crowded kitchen or manufacturing facility is necessary.

A third drawback of the prior art devices is that in the typical arrangement, the engagement of the drive shaft with either the output or auxiliary shafts induces a radial force on the drive shaft which tends to displace the drive away from the shaft it is driving. Therefore, the shafts and their supporting structures must be sufficiently strong to overcome this radial force which increases the costs of manufacturing and operating such a design.

A further drawback of such prior art designs is that they necessitate the placement of some type of clutch assembly on the drive shaft so that the drive shaft will drive the output shaft when rotated in one direction but will drive the auxiliary shaft when rotation is reversed. Typically, clutches are parts which are subject to increased wear and reduced lifespan and must occasionally be replaced. The placement of such a component on the drive shaft makes its replacement more difficult as the drive shaft is connected to the motor. In fact, servicing a clutch disposed on a drive shaft may necessitate removal of the motor as well as the shaft itself. In such prior art devices, if the clutch is relocated from the drive shaft, it must be placed on the output shaft which is frequently connected to other gearboxes or devices thus making removal of the output shaft as problematic as removal of the drive shaft.

Thus, it is an object of the present invention to provide a four-speed gearbox having multiple unidirectional output speeds based upon a reversible input.

It is a further object of the present invention to provide a four-speed gear box which will provide increased flexibility in the selection of initial, intermediate and final drive ratios.

It is an additional object of the present invention to provide a gearbox which reduces the vertical profile of an appliance utilizing the present gearbox designs and to provide a compact gear-box design without reducing the flexibility in selecting gear ratios for the drive paths.

It is a further object of the present invention to provide a four-speed gearbox which reduces the need for a strengthened, or heavier, drive shaft and supporting structure as a result of radial force on the shaft as a result of the engagement of gears in the drive path.

It is a further object of the present invention to provide a simplified gearbox which avoids the placement of clutches on the primary drive or output shafts to facilitate the service or replacement of components which typically have a lifetime shorter than that of the appliance.

SUMMARY OF THE INVENTION

A preferred embodiment of the present invention relates to a four-speed gearbox for use in a commercial appliance which will provide for a unidirectional output from a reversible input. In a preferred embodiment, a drive shaft is driven by a motor having forward and reverse drive directions. Disposed on the end of the drive shaft opposite the motor is a worm. First and second auxiliary shafts are disposed adjacent to the worm and are generally perpendicular to the drive shaft. Located on the first auxiliary shaft is a first worm wheel positioned such that it engages the worm. A second worm wheel is likewise positioned on the second auxiliary shaft. The arrangement of these shafts and gears is such that when the drive shaft is rotated by the motor, the first and second auxiliary shafts are driven in opposite rotational directions. An output shaft is provided for ultimately transmitting power from the gearbox to the appliance. A first drive path is disposed between the first auxiliary shaft and the output shaft and a second drive path is disposed between the second auxiliary shaft and the output shaft- One-way roller clutches are disposed in the first and second drive paths such that when the first auxiliary drive shaft is driven in a first direction the output shaft is driven through the first drive path and when the first auxiliary shaft is driven in second direction, opposite the first, the output shaft is not driven through the first drive path, but rather the output shaft is driven through the second drive path.

In the preferred embodiment, the first worm wheel and first drive path provide a first overall gear ratio which is different from a second overall gear ratio provided by the second worm wheel and second drive path. With these features, when the first auxiliary shaft is driven in the first direction at a first input speed, the output speed will be different than when the second auxiliary shaft is driven in the first direction at the same first input speed. Thus, the output shaft may be driven at two different speeds by simply reversing the direction of the motor.

In the preferred embodiment, four output speeds are provided by utilizing a two-speed reversible motor having two forward speeds and two reverse speeds. The output speed is changed by changing the motor speed or direction or both.

In the preferred embodiment the gear ratio between the worm and first and second worm wheels is selected to achieve a speed reduction in the first and second worm wheels relative to the drive shaft, and the first and second worm wheels and first and second auxiliary shafts are located on opposite sides of the worm such that rotation of the drive shaft in one direction will result in the rotation of the first and second auxiliary shafts in opposite directions.

In the preferred embodiment the first drive path, in addition to comprising the first worm wheel and first auxiliary shaft, includes a first auxiliary gear disposed on the first auxiliary shaft and a first output gear disposed on the output shaft. The first auxiliary gear and first output gear are engaged and the output shaft is driven through the first drive path when the first auxiliary shaft is rotated in the first direction. Also, the second drive path, in addition to the second worm wheel and second auxiliary shaft, includes a second auxiliary gear on the second auxiliary shaft and a second output gear on the output shaft. The second auxiliary gear and second output gear are engaged and the output shaft is driven through the second drive path when the second worm gear is driven in the first direction.

In the preferred embodiment, the gear ratio between the first auxiliary gear and the first output gear is selected to effect a speed increase in the speed of the rotation of the output shaft relative to that of the first auxiliary shaft. In this embodiment, the gear ratio between the second auxiliary gear and the second output gear is selected to effect a speed reduction in the speed of rotation of the output shaft relative to that of the second auxiliary shaft.

BRIEF DESCRIPTION OF THE DRAWINGS

These and other features of the present invention will be best understood with reference to the following detailed description of a preferred embodiment and the drawings in which.

DETAILED DESCRIPTION OF PREFERRED EMBODIMENT

Figure 1:
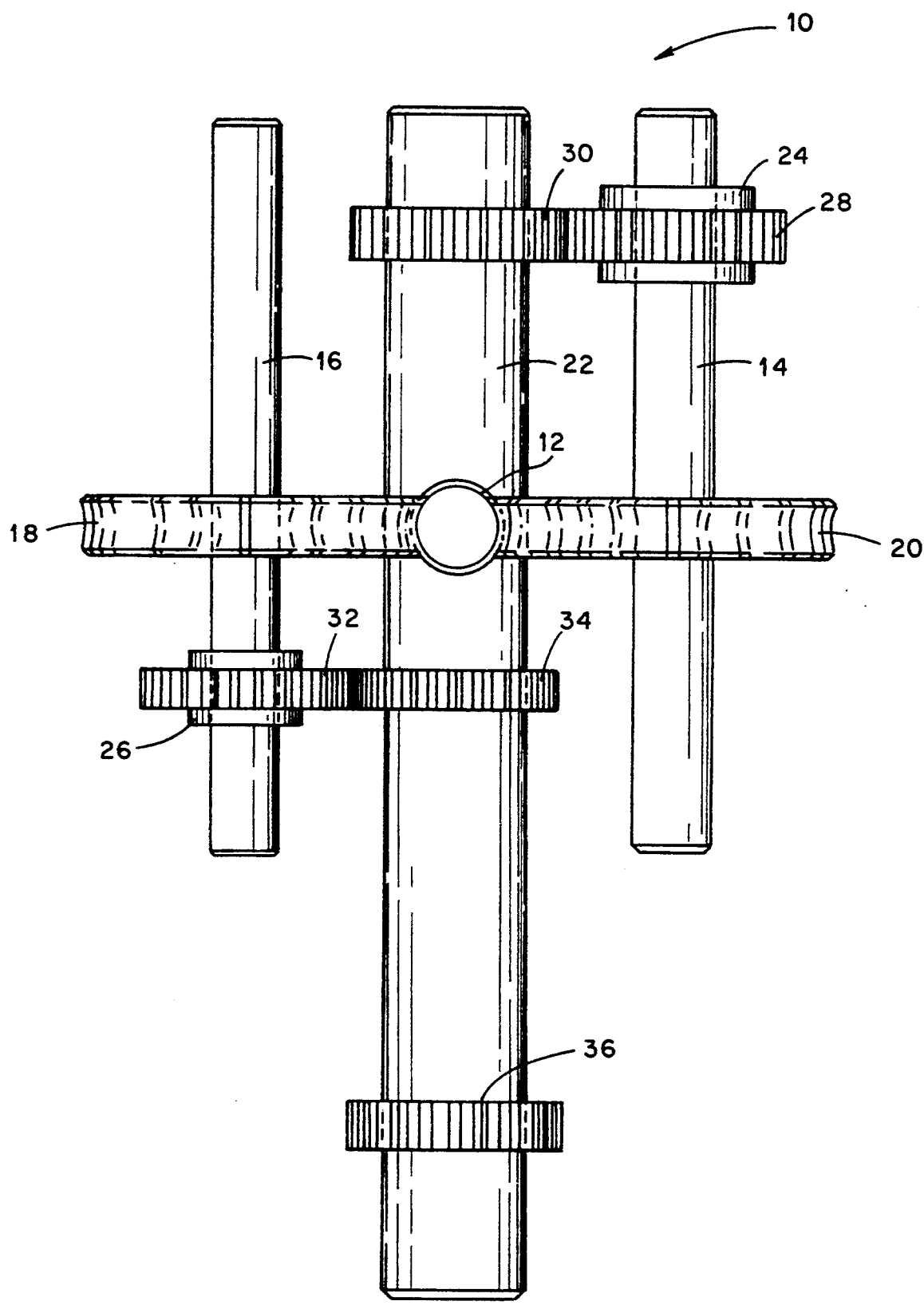
FIG. 1 is a simplified schematic view of the major components of a preferred embodiment of the gear box.
Figure 2:
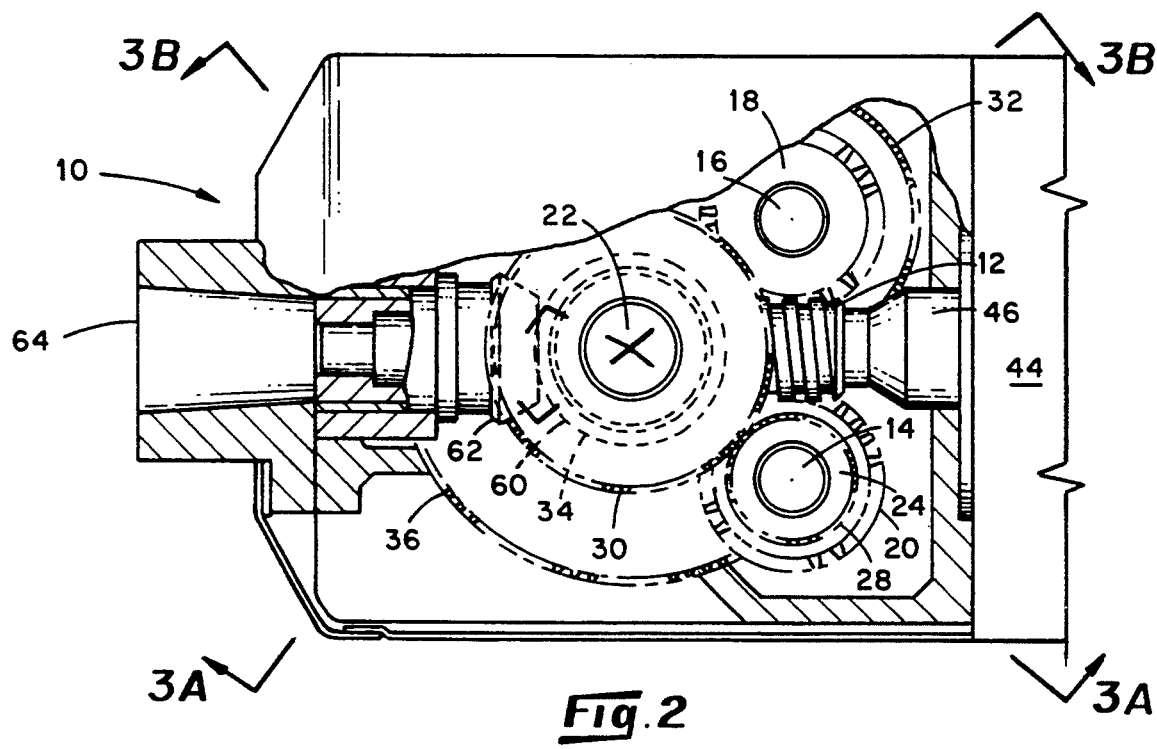
FIG. 2 is a top view of a schematic of the preferred embodiment of the gear box.

Referring now to FIGS. 1–6, the features of a preferred embodiment of the present 4-speed gear box 10 are shown. The gear box includes a drive shaft 46 which is attached to an electric motor 44. A worm 12 is disposed on the end of the drive shaft 46 for transferring power from the motor 44 into the gear box 10. A first auxiliary shaft 14 and second auxiliary shaft 16 are located near the terminus of the drive shaft 46 and are generally perpendicular to the drive shaft 46 and parallel to each other. A first worm wheel 20 is located on the first auxiliary shaft 14 while a second worm wheel 18 is located on the second auxiliary shaft 16. The first worm wheel 20 and second worm wheel 18 engage the worm 12 such that rotation of the drive shaft 46 will result in the rotation of the first auxiliary shaft 14 and second auxiliary shaft 18. As is apparent from the drawings, the first auxiliary shaft 14 will rotate in a direction of rotation opposite that of the second auxiliary shaft 16 regardless of the direction of rotation of the drive shaft 46.

Also disposed on the first auxiliary shaft 14 is a first one way roller clutch 24 and a first auxiliary gear 28. The first one way roller clutch 24 and first auxiliary gear 28 cooperate such that the first auxiliary gear 28 will be driven by the first auxiliary shaft 14 when the first auxiliary shaft is rotating in a first direction but will "free wheel" with respect to the first auxiliary shaft 14 when the shaft is rotating in a second direction, opposite to the first. An output shaft 22 is disposed adjacent to and substantially parallel to both the first auxiliary shaft 14 and second auxiliary shaft 16.

A first output gear 30 is disposed on the output shaft 22 to engage the first auxiliary gear 28 such that when the first auxiliary gear is driven by the first auxiliary shaft 14, as when the first auxiliary shaft 14 is rotating in a first direction, the output shaft 22 is driven through the first auxiliary gear 28 and first output gear 30.

As was previously described, a second worm wheel 18 is disposed on the second auxiliary shaft 16 which engages the worm 12 and is driven by rotation of the drive shaft 46. Also, as was previously discussed, when the first auxiliary shaft 14 is rotating in a first direction, the second auxiliary shaft 16 is driven in the second direction which is opposite the first direction. Disposed on the second auxiliary shaft is a second one way roller clutch 26 which is engaged cooperatively with a second auxiliary gear 32. The second one way roller clutch operates in a manner such that when the second auxiliary shaft is rotated in the first direction, the second auxiliary gear 32 is driven by the rotation of the second auxiliary shaft 16. When the second auxiliary shaft 16 is rotated in the second direction, opposite the first, the second one way roller clutch 26 allows the second auxiliary gear 32 to "free wheel" with respect to the second auxiliary shaft 16. A second output gear 34 is disposed on the output shaft 22 adjacent the second auxiliary gear 32 such that when the second auxiliary gear 32 is driven by the second auxiliary shaft 16, as when the second auxiliary shaft 16 is rotated in the first direction, the output shaft 22 is driven through the second auxiliary shaft 16.

In operation, when the motor 44 is rotating the drive shaft 46 in a first direction, as by motor 44 operating in a forward direction, the first auxiliary shaft 14 is driven through first worm wheel 20 in the first direction and the second auxiliary shaft 16 is driven through the second worm wheel 18 in the second direction. Thus, since the first auxiliary shaft 14 is rotating in the first direction, the first one way roller clutch 24 is engaged such that the output shaft is driven through first output gear 30 and first auxiliary gear 28 while the second auxiliary gear 32 is rotating freely with the second auxiliary shaft 16. However, when the drive shaft 46 is rotating in an opposite direction, as by the motor operating in reverse, the second auxiliary shaft 16 is driven through second worm wheel 18 in the first direction while the first auxiliary shaft 14 is driven through first worm wheel 20 in the second direction. When this condition obtains, the second one way roller clutch 26 is engaged such that the output shaft is driven through second output gear 34 and second auxiliary gear 32. With respect to the first auxiliary shaft 14, the first auxiliary gear 28 is allowed to rotate freely with respect to the first auxiliary shaft 14 since the first auxiliary shaft 14 would be rotating in the second direction. Regardless of the direction of rotation of the drive shaft 46, the output shaft 22 will always be driven in one direction corresponding to the second direction described above.

Referring to FIG. 1, a further output gear 36 could be located on the output shaft 22 which could then be coupled to a planetary gear set 66 to drive the appliance or the rotation of the output shaft 22 could be used directly to drive an appliance.

Figure 3:
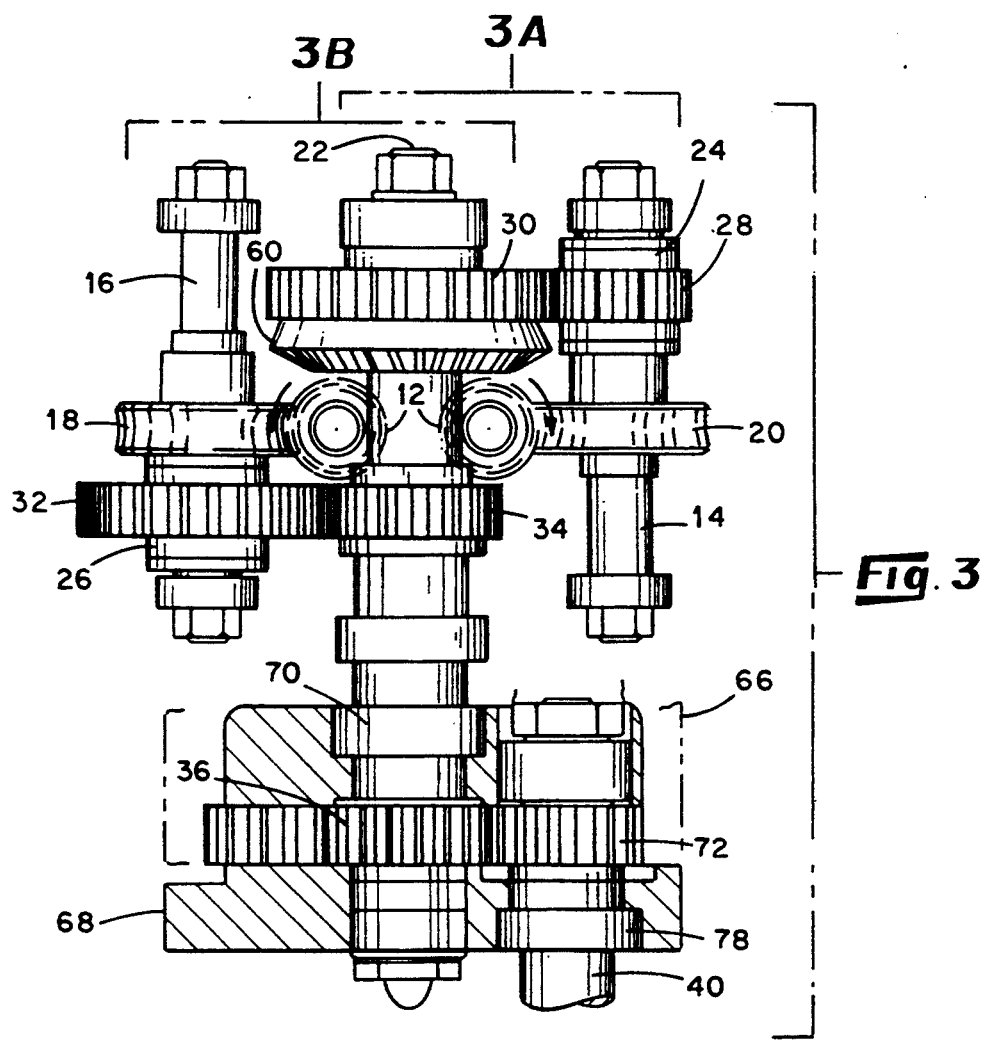
FIG. 3 is a schematic diagram of the major components of a preferred embodiment showing a combination of two separate views which are indicated by view lines A—A and B—B in FIG. 2.
Figure 4:
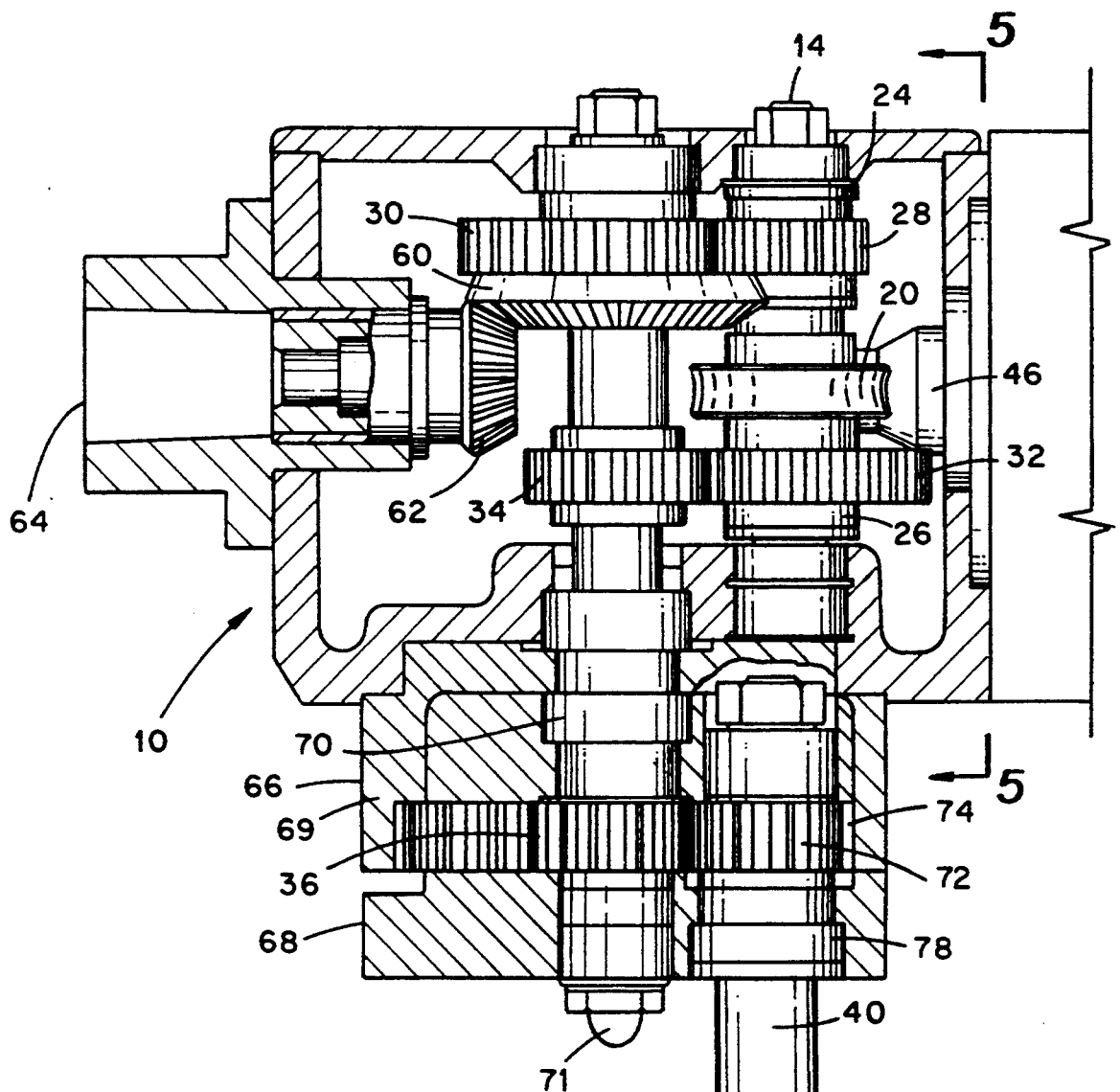
FIG. 4 is a somewhat diagrammatical side view of a commercial appliance incorporating the preferred embodiment of the present invention.
Figure 5:
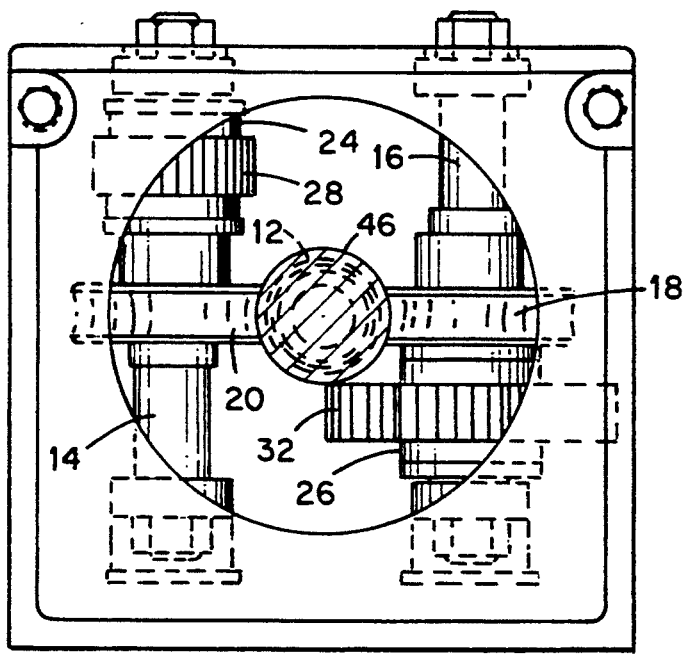
FIG. 5 is an end view schematic of the preferred embodiment taken along the view line 5—5 of FIG. 4.
Figure 6:
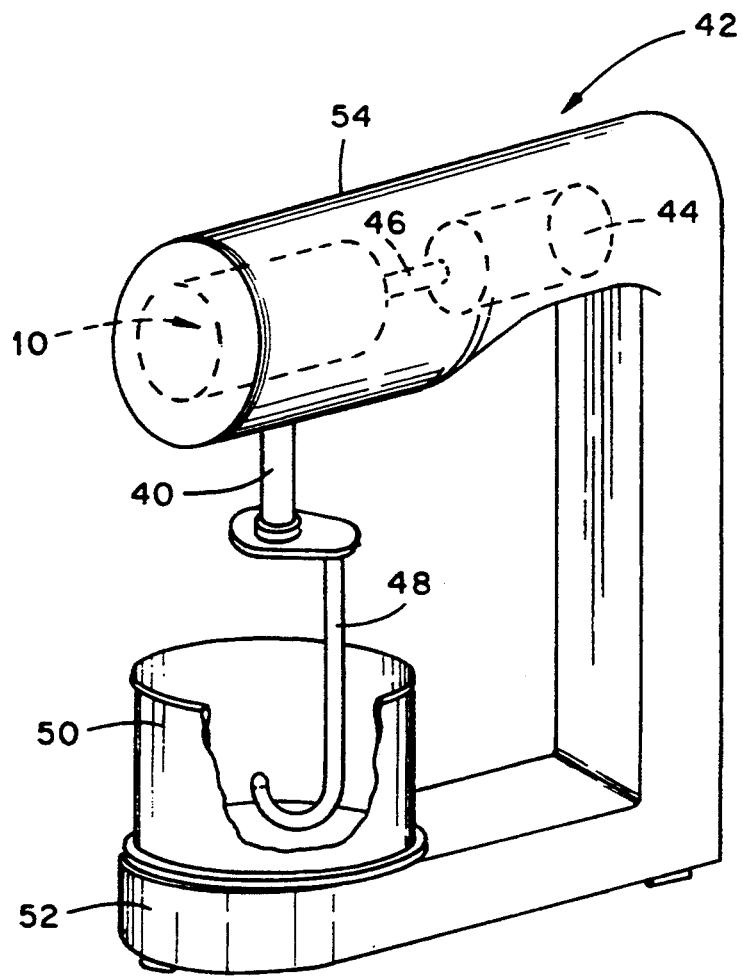
FIG. 6 is a diagram of a commercial appliance depicting the relative location of various components of the preferred embodiment of the present invention.

Referring now to FIGS. 2 through 5, additional features of a preferred embodiment may be described. Initially, it should be noted that FIG. 3 substantially corresponds to the simplified drawing of FIG. 1 but shows additional features and details. Additionally, it should be noted that two different views along two different view lines are included in FIG. 3 and thus the first auxiliary shaft 16 and second auxiliary shaft 14 are overly displaced in the view of FIG. 3, which requires the drawing of two separate worms 12 in FIG. 3. In actuality, there is only one worm 12 on a single drive shaft 46 and not the apparent two worms 12 shown in FIG. 3. One additional feature shown in FIGS. 2 through 5 is the inclusion of a power take-off system in the basic four speed gear box 10. For example, a fourth output gear 60 located on the output shaft 22 may engage a power take-off gear 62 to drive a power take-off or accessory hub 64. Thus, when power take-off gear 62 is brought into engagement with the fourth output gear 60, the power take-off of hub 64 may rotate and accessories connected to the hub 64 may operate. A further additional feature shown in the views of FIGS. 3 and 4 is the inclusion of a planetary gear set 66. As previously described, the output of output shaft 22 may be further transmitted by a third output gear 36 to a planetary gear set 66. The output of the planetary gear set 66 can further be transmitted to an attachment shaft 40 to which an appliance 48 may be attached. For example, in a preferred embodiment, the four speed gear box 10 may be incorporated into a commercial mixer and the appliance 48 may be a mixing blade for stirring the contents of a mixing bowl 50.

With reference to FIG. 4, the operation of the planetary gear set 66 may be understood. Third output gear 36 may function as a central gear in a planetary gear set around which a planetary gear 72 may rotate. A ring gear 74, which meshes with the planetary gear 72, is incorporated into a housing 69. A ball bearing 70 isolates the output hub 68 from the output shaft 22 so that the hub 68 may rotate at a different rotational speed from the output shaft 22. A needle bearing 71 further serves to complete the isolation of the output hub 68 from the output shaft 22. Thus, the attachment shaft 40 and output hub 68 are both driven through the planetary gears set comprised of output gear 36, planetary gear 72 and ring gear 74. Ball bearing 78 is used to isolate the attachment shaft 40 from the output hub 68 so that the attachment shaft 40 may be rotated with respect to the hub 68 as well as with respect to the output shaft 22.

Use of this particular planetary gear set provides for an additional location for achieving a desired gear reduction and provides for greater flexibility in selecting gear ratios throughout the drive train. For example, a final 3:1 reduction between the output shaft 22 and the output hub 68 may be achieved by selecting appropriate output gear 36, planetary gear 72 and ring gear 74 tooth spacing such as utilizing a 22 tooth gear for output gear 36, a 22 tooth gear for planetary gear 72 and a sixty-six tooth gear for ring gear 74. It should be noted however, that the use of a planetary gear set as the output mechanism for the four-speed drive system is a feature of but one embodiment of the present invention and a variety of final output mechanisms may be utilized without departing from the scope of the invention.

In a preferred embodiment the pitch of the worm 12 and the first and second auxiliary gears 20, 18 is selected so that a substantial reduction in speed is effected between the drive shaft 46 and the first and second auxiliary shafts 14, 16. In this preferred embodiment, the second auxiliary gear 32 and second output gear 34 are selected to achieve a speed increase in the output shaft 22 with respect to the speed of rotation of the second auxiliary shaft 16. Finally, in this preferred embodiment, the gear ratio between the first auxiliary gear 28 and first output gear 30 is selected to achieve a speed reduction in the output shaft 22 with respect to the speed of rotation of the first auxiliary shaft 14. Thus, in this embodiment, the overall gear ratio of a first drive path defined by the worm 12, first worm wheel 20, first auxiliary shaft 14, first auxiliary gear 28, and first output gear 30 would be different than the overall gear ratio through a second drive path defined by worm 12, second worm wheel 18, second auxiliary shaft 16, second auxiliary gear 32 and second output gear 34. Thus, two speeds of rotation of the output shaft 22 in the second direction is provided merely by having a reversible electric motor 44. The number of speeds can be multiplied to four by utilizing a two speed reversible motor 44 to achieve four uni-directional output speeds of the output shaft 22. It may further be desirable to incorporate special motor control circuitry into such a design to facilitate the smooth and efficient reversal of motor direction without damage to the motor or transmission.

In the preferred embodiment, the worm 12 and first and second worm wheels 20 and 18 are selected to achieve a 5:1 reduction in rotational speed between the drive shaft 46 and first and second auxiliary shafts 14, 16. In this preferred embodiment a gear ratio of approximately 1:1.5 is selected for the second auxiliary gear 32 and second output gear 34 to achieve a rotational speed increase in the output shaft 22 relative to the second auxiliary shaft 16. Also, in this preferred embodiment, a gear ratio of approximately 2:1 may be selected for the first auxiliary gear 28 and first output gear 30 to achieve a reduction in rotational speed of the output shaft 22 with respect to the first auxiliary shaft 14.

The design of the preferred embodiment represents several advances over prior art gear boxes. Initially, since the drive shaft 46 is perpendicular to the auxiliary shafts 14, 16 and the output shaft 22, the motor and drive shaft may be placed in the extension arm of a commercial appliance as demonstrated in FIG. 6. Thus, this arrangement combined with the fact that the motor and drive shaft are not arranged in a parallel arrangement with respect to the output shaft 22 allows for increased efficiency in use of space and in a reduced overall vertical height of the appliance.

An additional advantage presented by the preferred embodiment is that, regardless of which drive path is utilized, there are at least two gear pairs situated in the drive path allowing for an extensive flexibility in selecting an intermediate and final drive ratio through any drive path which results in greater flexibility in choosing an overall gear ratio through each drive path. In prior art gear boxes where the drive shaft would directly drive the output shaft in one direction of rotation, this flexibility was lost as there was only a single gear pair in one drive line; this resulted in difficulty in achieving significant gear reduction because very large gears were needed which may not fit within the gear box dimensions. Thus, with the present design a wider variety of gear ratios are available in a more compact design.

A further advantage of the present embodiment is the location of two auxiliary shafts 14 and 16 on opposite sides of the worm 12. As is known in the art, when a drive shaft and worm engage a gear located on a shaft perpendicular to the drive shaft, a radial force is exerted on the drive shaft which would tend to force the drive shaft away from the engagement. Thus, in many prior art designs it would be necessary to over build the drive shaft 46 to resist this force caused by engagement with a gear. However, in the preferred embodiment of the present invention, the constant engagement of the first and second worm wheels 18 and 20 and the support provided thereby through the first and second auxiliary shafts 14 and 16, provides an inherent opposing force to such radial force and obviates the need for a strengthened drive shaft 46. This may allow for the use of a lighter drive shaft which reduces the production costs and also increases the efficiency of the gear box by minimizing of moment of inertia of the drive shaft 46.

Additionally, the design of the preferred embodiment allows for the placement of one way roller clutches 24 and 26 on the auxiliary shafts 14 and 16 wherein in prior art devices, at least one one way roller clutch would have to be placed on the drive shaft or the output shaft. Clutches are parts which are subject to wear and frequently are subject to failure sooner than the lifespan of the appliance in which they are located. In prior art devices where a clutch is on an output shaft or a drive shaft, changing the clutch could necessitate the removal of the drive shaft or even the drive shaft and motor which increases the difficulty of service. If a clutch were located on an output shaft, service could be difficult as well because an output shaft is frequently connected to some type of attachment or to another gear box. In the design of the preferred embodiment of the present invention, the auxiliary shafts 14 and 16 are easily serviced without necessitating a major disassembly of the drive shaft/motor mechanism or the output shaft.

In the preferred embodiment of the present invention, the drive system is shown in place in a commercial mixer. It should be noted however, that the drive system of the present invention has wide variety of uses in various commercial appliances or in other areas where a multiple speed gear box having an uni-directional output based upon a reversible input is desired. Thus, the preceding description of a preferred embodiment is presented for the purposes of illustration and not limitation.

I claim:

1. A drive system for providing a multiple speed output in a single direction of rotation from a reversible input comprising:

a motor having a forward and a reverse drive direction;

a drive shaft to be driven by said motor having a first end connected to said motor and a second end;

a worm disposed on said second end of said drive shaft and rotated by the rotation of said drive shaft;

a first auxiliary shaft disposed near said second end of said drive shaft and substantially perpendicular to said drive shaft, having a first worm wheel disposed thereon and located adjacent to and engaging said worm such that said first auxiliary shaft is driven by the rotation of said drive shaft;

a second auxiliary shaft disposed near said second end of said drive shaft, substantially perpendicular to said drive shaft and substantially parallel to said first auxiliary shaft, having a second worm wheel located adjacent to and engaging said worm such that said second auxiliary shaft is driven by the rotation of said drive shaft in a direction opposite the direction of rotation of said first auxiliary shaft;

an output shaft;

a first drive path disposed between said first auxiliary shaft and said output shaft;

a second drive path disposed between said second auxiliary shaft and said output shaft;

a first one way roller clutch disposed in said first drive path such that, when said first auxiliary shaft is driven in a first direction, said output shaft is driven and rotates with said first auxiliary shaft and, when said first auxiliary shaft is driven in a second direction, opposite said first direction, said output shaft is not driven by said first auxiliary shaft;

a second one way roller clutch disposed in said second drive path such that, when said second auxiliary shaft is driven in the first direction, said output shaft is driven and rotates with said second auxiliary shaft and, when said second auxiliary shaft is driven in said second direction opposite said first direction, said output shaft is not driven by said second auxiliary shaft;

said first worm wheel and said first drive path providing a first overall gear ratio; and said second worm wheel and said second drive path providing a second overall gear ratio that is different from the first overall gear ratio such that, when said first auxiliary shaft is driven in the first direction at a first input speed, said first auxiliary shaft drives said output shaft in an output direction at a first output speed and, when the second auxiliary shaft is driven in the first direction at said first input speed, said second auxiliary shaft drives the output shaft in said output direction at a second output speed that is different from the first output speed, whereby reversing the drive direction of the motor but maintaining the same motor speed will change the speed of the output shaft but will maintain the same direction of output shaft rotation.

2. The apparatus of claim 1 wherein said first worm wheel is located on the opposite side of said worm from said second worm wheel.

3. The apparatus of claim 1 wherein said motor has two operating speeds in said forward direction and two operating speed in said reverse direction wherein each of said two operating speeds in said forward direction will result in two speeds of rotation for said output shaft driven through said first drive path and each of said two operating speeds in said reverse direction will result in two speeds of rotation for said output shaft driven through said second drive path such that four output speeds of rotation are provided for said output shaft.

4. The apparatus of claim 1 wherein said first drive path is further comprised of:

a first auxiliary gear disposed on said first auxiliary shaft; and a first output gear disposed on said output shaft and positioned such that said first auxiliary gear engages said first output gear and drives said output shaft when said first auxiliary shaft is rotated in said first direction.

5. The apparatus of claim 1 wherein said second drive path further comprises:

a second auxiliary gear disposed on said second auxiliary shaft; and a second output gear disposed on said output shaft and positioned such that said second auxiliary gear engages said second output gear and drives said output shaft when said second auxiliary shaft is rotated in said first direction.

6. A four speed drive system for use in a commercial appliance comprising:

a motor capable of operating in a forward drive direction and a reverse drive direction;

a drive shaft to be driven by said motor having a first end connected to said motor and a second end;

a worm disposed on said second end of said drive shaft and rotated by the rotation of said drive shaft;

a first auxiliary shaft disposed near said second end of said drive shaft and substantially perpendicular to said drive shaft, having a first worm wheel disposed thereon and located adjacent to and engaging said worm such that said first auxiliary shaft is driven by the rotation of said drive shaft;

a second auxiliary shaft disposed near said second end of said drive shaft, substantially perpendicular to said drive shaft and substantially parallel to said first auxiliary shaft, having a second worm wheel located adjacent to and engaging said worm such that said second auxiliary shaft is driven by the rotation of said drive shaft in a direction opposite the direction of rotation of said first auxiliary shaft;

a first auxiliary gear disposed on said first auxiliary shaft;

a second auxiliary gear disposed on said second auxiliary shaft;

a first one way roller clutch disposed on said first auxiliary shaft such that when said first auxiliary shaft is driven in a first direction, said first auxiliary gear is driven and rotates with said first auxiliary shaft and when said first auxiliary shaft is driven in a second direction, opposite said first direction, said first auxiliary gear is not driven by said first auxiliary shaft and may remain stationary or rotate in a direction opposite to the rotation of said first auxiliary shaft;

a second one way roller clutch disposed on said second auxiliary shaft such that when said second auxiliary shaft is driven said first direction, said second auxiliary gear is driven and rotates with said second auxiliary shaft and when said second auxiliary shaft is driven in said second direction, said second auxiliary gear is not driven by said second auxiliary shaft and may remain stationary or rotate in a direction opposite to said second auxiliary shaft; and an output shaft disposed adjacent and parallel to said first and second auxiliary shafts having a first output gear disposed on said output shaft adjacent to said first auxiliary gear such that when said first auxiliary gear is driven by said first auxiliary shaft said first output gear is driven by said first auxiliary gear and said output shaft rotates in an output direction, and a second output gear disposed on said output shaft adjacent to said second auxiliary gear such that when said second auxiliary gear is driven by said second auxiliary shaft said second output gear is driven by said second auxiliary gear and said output shaft rotates in said output direction, such that rotation of said drive shaft by said motor in either forward or reverse drive directions will result in said output shaft rotating in said output direction, and wherein the overall gear ratio provided by said first worm wheel, first auxiliary gear and first output gear is different from the overall gear ratio provided by said second worm wheel, second auxiliary gear and second output gear.

7. The apparatus of claim 6 wherein said first worm wheel is located on the opposite side of said worm from said second worm wheel.

8. The apparatus of claim 6 wherein the gear ratio between said worm and said first worm wheel is selected such that a speed reduction is effected between said drive shaft and said first auxiliary shaft.

9. The apparatus of claim 6 wherein the gear ratio between said worm and said second worm wheel is selected such that said a speed reduction is effected between said drive shaft and said second auxiliary shaft.

10. The apparatus of claim 6 wherein the gear ratio between said first auxiliary gear and said first output gear is selected such that a speed increase is effected between said first auxiliary shaft and said output shaft.

11. The apparatus of claim 6 wherein the gear ratio between said second auxiliary gear and said second output gear is selected such that a speed reduction is effected between said second auxiliary shaft and said output shaft.

12. The apparatus of claim 6 wherein said motor has two operating speeds in said forward direction and two operating speeds in said reverse direction wherein each of said two operating speeds in said forward direction will result in two speeds of rotation for said output shaft driven through the drive path comprised of said first worm wheel, first auxiliary gear and first output gear and each of said two operating speeds in said reverse direction will result in two speeds of rotation for said output shaft driven through the drive path comprised of said second worm wheel, second auxiliary gear and second output gear such that four output speeds of rotation are provided for said output shaft.

* * * * *